United States Patent [19]

King

[11] Patent Number: 5,584,399

[45] Date of Patent: Dec. 17, 1996

[54] SPACE EFFICIENT VERSATILE STORAGE FRAME SYSTEM

[76] Inventor: William E. King, 3810 Lane Lake Rd., Bloomfield Hills, Mich. 48302

[21] Appl. No.: 346,671

[22] Filed: Nov. 30, 1994

[51] Int. Cl.$^6$ .................................................. A47F 7/00
[52] U.S. Cl. .................. 211/41; 211/189; 280/47.34; 280/79.3; 280/79.7
[58] Field of Search ............................ 211/41, 189, 182; 280/79.3, 79.7, 47.34, 47.35

[56] References Cited

U.S. PATENT DOCUMENTS

| | | | |
|---|---|---|---|
| 2,466,149 | 4/1949 | Burg | 280/47.34 X |
| 2,518,624 | 8/1950 | Kraft | 211/13 |
| 2,681,233 | 6/1954 | Smith | 280/79.7 |
| 2,839,198 | 6/1958 | Lefevre | 211/41 |
| 2,863,566 | 12/1958 | White et al. | 211/41 |
| 2,865,513 | 12/1958 | Allen | 211/41 |
| 3,031,084 | 4/1962 | Mugler | 211/2 |
| 3,193,093 | 7/1965 | Hansen | 206/62 |
| 3,207,093 | 9/1965 | Block | 108/16 |
| 3,233,753 | 2/1966 | Rich | 214/10.5 |
| 3,301,405 | 1/1967 | Turney | 211/41 |
| 3,596,755 | 8/1971 | Bundy et al. | 206/62 R |
| 3,669,464 | 6/1973 | Linzmeier | 280/47.34 |
| 3,719,284 | 3/1973 | Rasmusson et al. | 211/50 |
| 3,815,755 | 6/1974 | Lyszczek | 211/41 |
| 3,915,309 | 10/1975 | Brazdo | 211/13 |
| 3,955,676 | 5/1976 | Hansen et al. | 206/451 |
| 4,033,597 | 7/1977 | Boyer | 280/46 |
| 4,360,211 | 11/1982 | Blake | 280/79.7 |
| 5,037,117 | 8/1991 | Hershberger | 280/79.7 |
| 5,253,887 | 10/1993 | Marenger | 280/47.34 X |

FOREIGN PATENT DOCUMENTS 2202820   10/1988   United Kingdom .................. 280/79.7

Primary Examiner—Robert W. Gibson, Jr.
Attorney, Agent, or Firm—Howard & Howard

[57] ABSTRACT

A unique framing system is disclosed which provides efficient use of floor space for storing panel members in any one of several desired configuration. The several interactive components of the system interfit easily such that the system may be tailored into a variety of configurations to suit a particular application. Wheel assemblies may be mounted at each end of the frame assembly, and are also configured for easy application and removal.

20 Claims, 4 Drawing Sheets

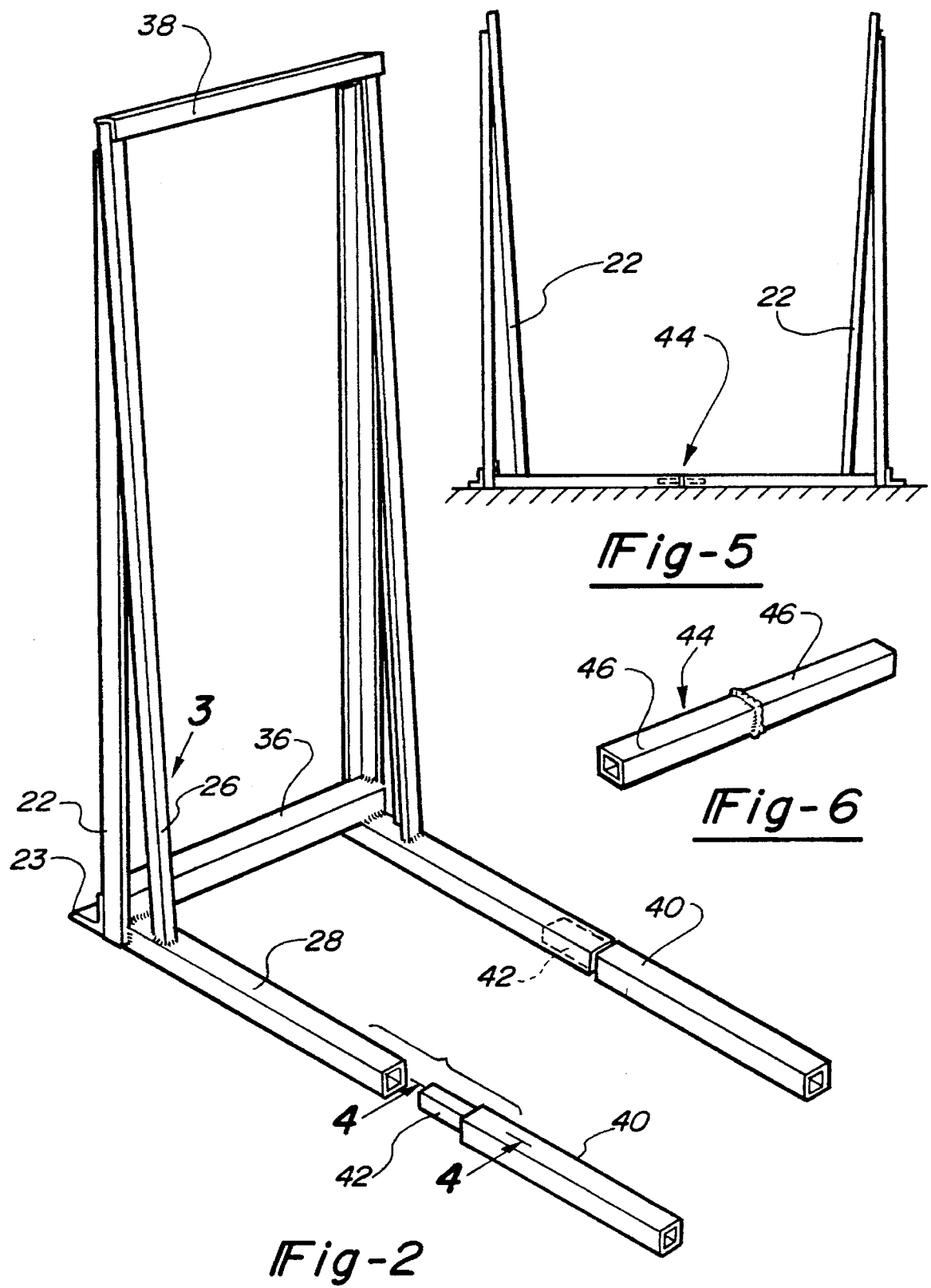

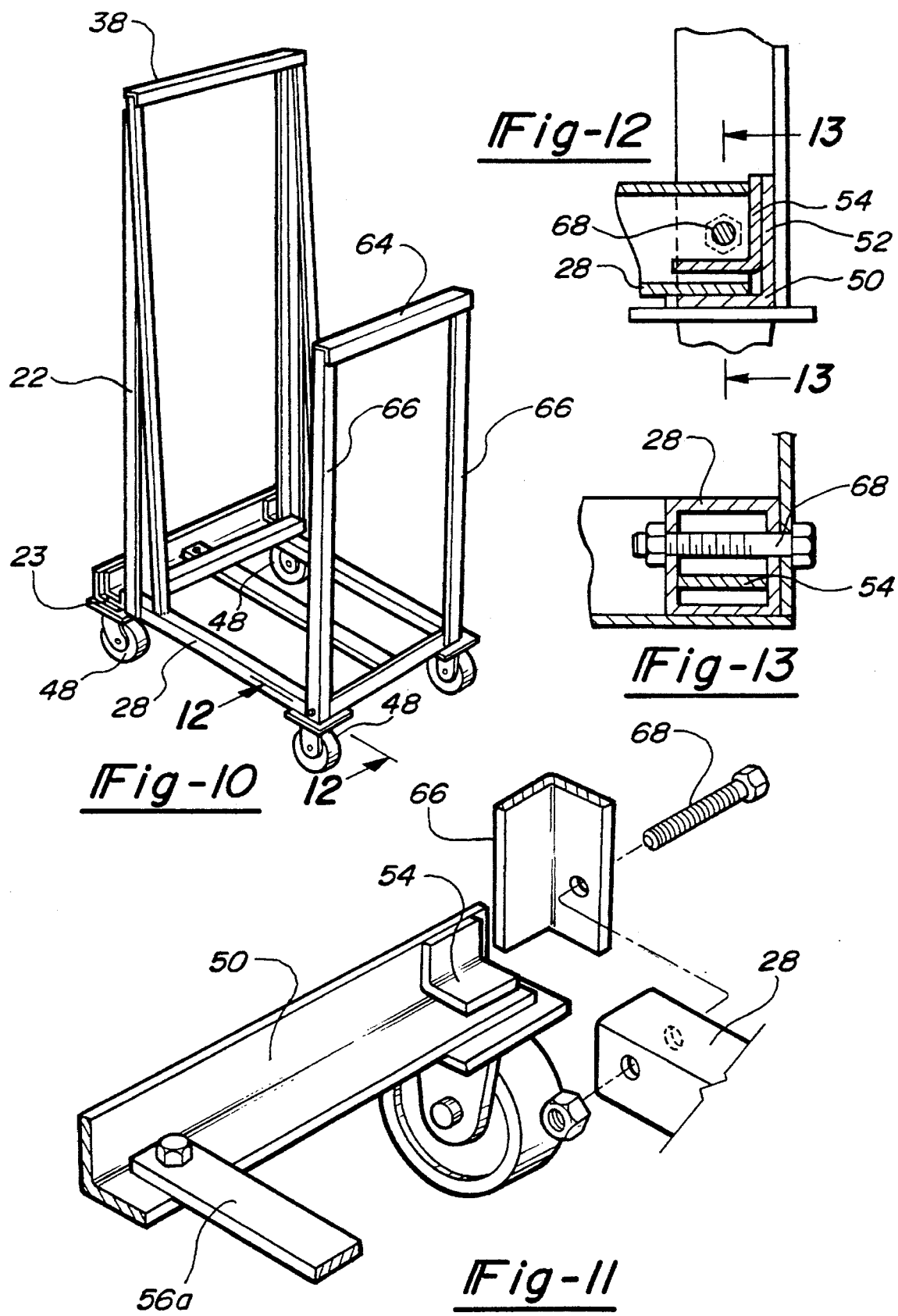

5,584,399

SPACE EFFICIENT VERSATILE STORAGE FRAME SYSTEM

BACKGROUND OF THE INVENTION

This application in general relates to a system for storing panel members and, in particular, doors, that provides efficient use of storage space and allows easy modification of the system to accommodate various storage needs.

In the prior art, various types of storage frame systems have been utilized to store panel members such as doors, windows, drywall, etc. In general, these systems have not efficiently utilized space. Moreover, they have not always readily stored the panels.

In some applications, it may be desirable to store large numbers of panels in a particular location. In some applications, a smaller number may be stored. It would be desirable to tailor the storage system for the given application. It may be desirable to facilitate movement of the storage frame on wheels, or allow it to be stationary. Prior art storage systems have not provided sufficient versatility in this regard. They tend to be stationary or mobile, and are not easy to modify. Moreover, the prior art systems have not efficiently utilized space, and thus have undesirable characteristics.

The two main types of prior racks for storing panels are an A-frame and an open-sided frame. The A-frame structure achieves stability by having angled supports with a cross member extending between the angled supports. The supports extend away from an upper connection point, with both supports extending at an angle relative to the vertical. Typically, the angles are equal to each other, and the rack takes a large amount of floor space due to the two extending supports. Further, if this type of support is loaded unevenly, it may sometimes slide.

The open-sided frame includes a structural rectangular frame that requires stored items to be slid in from the side. Such frames are typically made from uprights tied together at the top, as well as the bottom. While these structures may use space efficiently, they are not easy to utilize when moving the stored panels. If a worker needs to retrieve a panel that is stored behind others, it is somewhat inefficient to do so with this type of storage unit.

As such, it would be desirable to provide a more easily utilizable storage system.

SUMMARY OF THE INVENTION

In a disclosed embodiment of this invention, a storage system includes a basic frame unit formed of a pair of spaced back support bars, and a pair of spaced forward support bars extending at an acute angle from an upper location on the back support bars. The acute angle is preferably quite small and, more preferably, less than 10 degrees. In one embodiment, the angle is 3 degrees. The back support bars and the forward support bars are each connected to forwardly extending base support bars which actually support the panels, while receiving support from the forward support bar. The use of the combined back support bar and forward support bar disposed at a small angle relative to each other, along with the base support bars, provides a sturdy rack that stores the panels at the relatively small acute angle. The smaller the acute angle, the lesser is the floor space required to store the panels. Moreover, the smaller the angle, the greater the percentage of the weight of the panel borne by the base bars instead of the forward support bar. Moreover, the specific structure of this inventive storage rack ensures that panels and, in particular, doors are safely stored, preventing breakage.

In other features of this invention, the basic storage frame is combined with a system such that the basic frame is easily adaptable to any one of several configurations. In one preferred example, mount flanges extend rearwardly from the frame unit at each lateral side. Wheel assemblies receive the mount flanges to support the frame unit upon a set of wheels such that the assembly may be easily moved with the panels stored on the frame. The system may be modified such that the wheel assemblies mount a frame unit at one end of the storage assembly, and other wheel assemblies mount a handle at the other end. Alternatively, a pair of the basic frame units can be attached facing each other, with both storage frames mounted on wheel assembly sets. As will be described below, one main aspect of this invention is that the basic frame unit and other components, such as the wheel assemblies, are configured to allow easy modification of the system into these various configurations.

In preferred embodiments of this invention, the wheel assemblies at each end of the rack are connected by a laterally extending frame. A flange top is mounted at each lateral side of the laterally extending frame. The mount flange on the frame is positioned between the flange top and a lower base of the laterally extending frame, such that the frame unit is received on the wheel assembly. In this way, the basic frame unit may be quickly mounted upon the wheel assemblies.

In other features of this invention, each basic frame unit may be connected to a second opposed frame unit by a pair of plug connector members. The forwardly extending base support bars are preferably hollow tubes that can receive the plug in connectors such that two frame may be easily connected. With such a configuration, the wheel assemblies may be mounted at each end of the opposed storage frame units, and panels may be mounted on each of the opposed frame units for easy transport.

Alternatively, it may be desirable to connect the forwardly extending base bars of one frame to the second set of wheel assemblies, and connect a handle at that end to the second set of wheel assemblies. The hollow bars that form the forwardly extending base bars are easily received on the flange top of the wheel assembly, and are then bolted to the handle to connect the entire assembly. The basic components of this system all interfit together to form this inventive combination.

In one main feature provided by this invention, the hollow connectors that form the forwardly extending base bars selectively receive extension members such that large numbers of panels may be stored on any one basic support rack.

One other main feature of this invention is that the frame can be placed along walls, since the rear support walls extend directly perpendicular to the ground. The inventive storage frame may also be utilized to create aisles and can be utilized with extension members in a variety of geometric configurations to use available space to its most efficient extent.

These and other features of the present invention may be best understood from the following specification and drawings, which of the following is a brief description.

BRIEF DESCRIPTION OF THE DRAWINGS

FIG. 2 shows a modification of the system shown in FIG. 1.

FIG. 5 shows another configuration of the storage rack assembly of the present invention.

FIG. 6 is a view of a connector according to the present invention.

FIG. 10 shows yet another configuration of the inventive storage frame system.

FIG. 11 shows details of the assembly shown in FIG. 10.

FIG. 12 is a cross-sectional view along line 12—12 as shown in FIG. 10.

FIG. 13 is a cross-sectional view along line 13—13 as shown in FIG. 12.

DETAILED DESCRIPTION OF A PREFERRED EMBODIMENT

Figure 1:
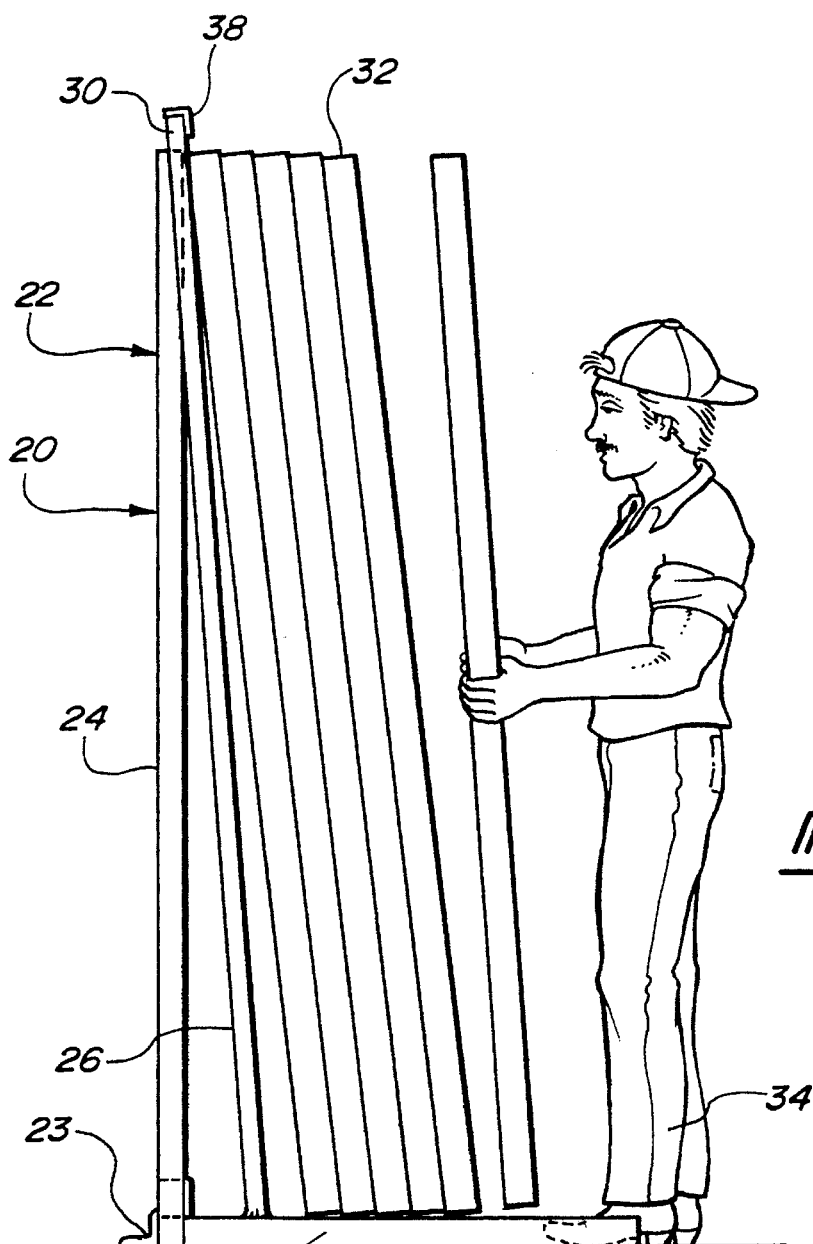
FIG. 1 is a view of the inventive storage frame system in a first configuration.

FIG. 1 shows a first configuration of an inventive storage frame system 20. As shown, the frame system 20 incorporates a basic storage frame 22 including a rear support bar 24, and a forward support bar 26. As will be explained below, there are a pair of both bars, with a second set of the bars spaced into the plane of FIG. 1. As shown, forward support bar 26 is formed at an angle A relative to rear support bar 24.

A forwardly extending base bar 28 extends from the rear support bar 24 and is connected to forward support bar 26. As shown, forward support bar 26 is connected 30 to an upper location on rear support bar 24. As shown, Angle A is a very small acute angle and is preferably less than 10 degrees, and most preferably less than 5 degrees. The angle A is preferably selected to be as small as possible, while still avoiding tipping. In one example, the distance between the rear support bar and the forward support bar along forwardly extending base bar 28 was five inches when the rear support bar extended for 80 inches. In this example, the two lateral sides are spaced by 28 inches. The acute angle A, thus, was about 3 degrees. With such a small acute angle, the panels 32 supported on the frame 22 extend almost directly vertically. In that way, the storage frame 22 efficiently uses floor space. Further, as will be explained below, there are a pair of forwardly extending base support bars 28 that are spaced. Thus, there is no obstruction in front of the frame 22, and a worker 34 can move between the base support bars 28 to have easy access to the panels 32. Moreover, the small angle ensures that the weight of the panel 32 will be supported upon the base bars 28, rather than the forward support bar 26. The bulk of the weight is supported on the base bars 28 with the inventive frame due to the relatively small angle. Although not shown in this figure, should this invention be utilized for storing glass or windows, a small wedge may be placed upon the top surface of base bar 28 to ensure that the glass or windows rest on a solid surface throughout their thickness.

The construction of the rear support bar 24 and the forward support bar 26, both being connected to base support bars 28 forms a reliable connection. The panels are supported by the frame 22 alone. The combined structural integrity of storage frame 22 is sufficient to support a large number of panels in a very small amount of space.

In a further feature of this invention, a mount flange 23 is connected to a lowermost portion of rear support bar 24. While flange mount 23 provides some additional support, and additional structural integrity to frame 22, its main function is in connecting the basic frame 22 to wheel assemblies, as will be described below. In addition, flange mount 23 moves the pivot point of the frame rearwardly from where it would be without flange mount 23. As such, the likelihood of the storage frame system tipping over rearwardly when lightly loaded is lessened due to the use of the flange mount 23.

As shown in FIG. 2, a lower laterally extending frame 36 connects the pair of rearward support bars 22 at a lower location, and an upper laterally extending frame 38 connects the forward support bars 26 at their upper location. The angle frame used for upper frame 38 has its planar facing supporting the panels, providing a greater support area. As explained above, there is a space between the two base support bars 28. The base support bars 28 are hollow frame members. An extension member 40 with a connector 42 may selectively be fit into the channel of the base support bar 28 to increase the length of support surface provided by the extending base support bars 28. Preferably, connector 42 is welded to extension member 40.

The extension members 40 allow the tailoring of the length of the storage frame system 20 easily and accurately. In the past, with fixed length framing systems, an assembler typically utilized unduly long framing systems that took up undesirably large amounts of space. The framing systems were typically made for the largest possible expected storage needs. By providing the easy tailoring of the length of the storage frame, applicant's invention allows the assembler to efficiently use space. Moreover, the base bars provide greater stability when the rack is empty or lightly loaded than would a thin angle bar due to the increased weight of the hollow wall.

Figure 3:
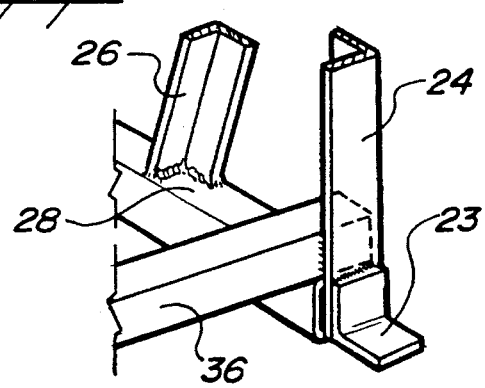
FIG. 3 shows a detail at the location of arrow 3 as shown in FIG. 2.

As shown in FIG. 3, mount flange 23 is connected to a lower location on the rear support bar 24. Lower frame 36 is connected to base support bars 28, and to rear support bar 22. Lower frame 36 is positioned above the ground to provide access for the bars of a lift truck. If used with a lift truck, some brackets for catching a forward end should be included on the base bars. Forward support bar 26 is an angle member with a planar surface facing the panels to provide greater support area.

Figure 4:
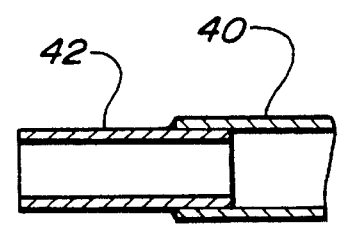
FIG. 4 is a cross sectional view along line 4—4 as shown in FIG. 2.

FIG. 4 is a detail along line 4—4 as shown in FIG. 2. As shown, plug in connector 42 may be welded to the remainder of the extension bar 40.

As shown in FIG. 5, a pair of the basic storage racks 22 may be connected by a dual connector 44 received in the opposed base bars 28. As shown in FIG. 6, the dual connector 44 includes two connector end members 46 having an outer dimension approximately equal to the inner dimension of the hollow channel of the base bars 28. In the illustrated embodiment, a single bar is provided with a weld joint stop bead.

With the configuration as shown in FIG. 5, a number of panels may be mounted facing each other. If a large number of panels are to be mounted in a particular area, this arrangement may be beneficial, as mounting an undue number of panels on a single frame unit 22 may begin to exceed the capability of the frame unit 22 to support the panels. With the connection of the opposed frame units as in FIG. 5, the panels supported on the combined assembly will in large part create forces that cancel each other, increasing the integrity of the overall unit. The configuration illustrated in FIG. 5 is particularly valuable when different types of panels are stored on the system. A worker may move the panels between the two forward support bar sides to provide access to underlying panel members. The single framing unit as shown in FIG. 1 is particularly valuable for storing a single type of panel member.

Figure 7:
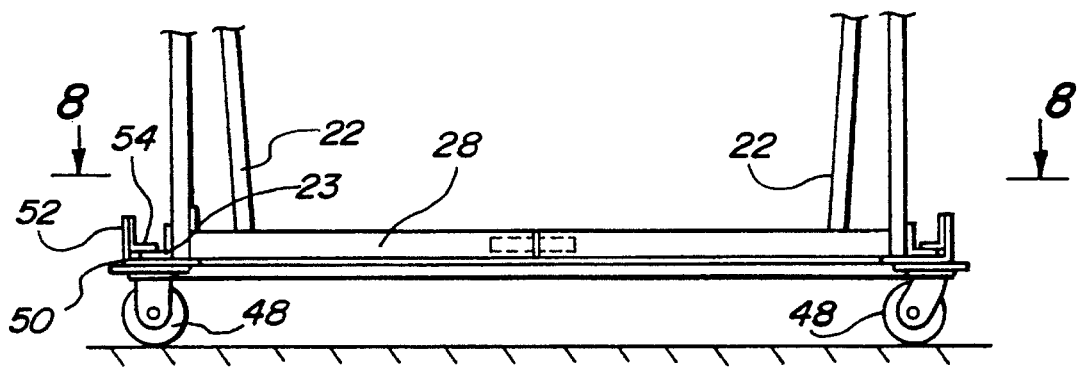
FIG. 7 shows yet another configuration of the frame system of the present invention.

FIG. 7 illustrates yet another important versatile feature of the overall system 20. As shown, the opposed connected storage frame units 22 as shown in FIG. 5 have now been mounted on wheel assemblies. Wheel assemblies 48 are mounted at each end of the combined frame units 22. Preferably, the wheel assemblies 48 may include locking wheels. As shown, a lateral bar 50 connects opposed wheels 48, and a rear wall 52 extends from lateral bar 50. A flange top 54 is affixed to rear wall 52. As can be seen, the flange mount 23 is received between flange top 54 and resting on lateral bar 50. The rear support bar 24 and the rear end of base bar 28 also rest on bar 50. The flange mount 23 thus provides a relatively quick method of connecting the frame units 22 onto a wheeled mount.

Figure 8:
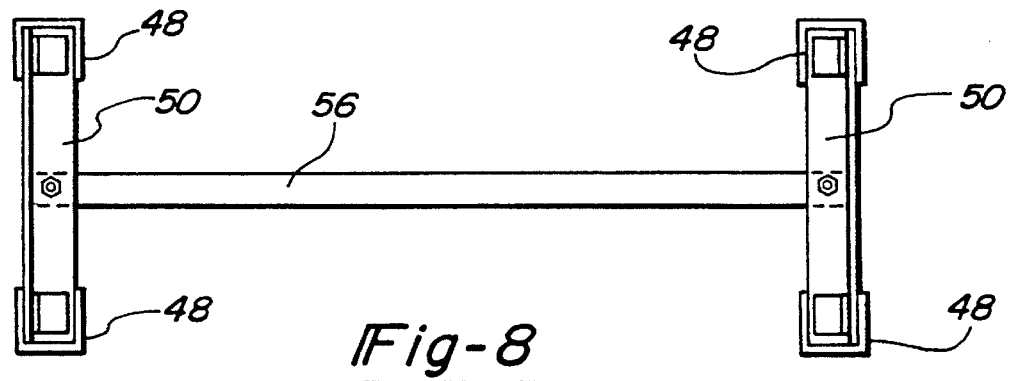
FIG. 8 is a plan view generally along line 8—8 as shown in FIG. 7, but with portions of FIG. 7 removed.

As shown in FIG. 8 (which is a plan view along line 8—8 as shown in FIG. 7, but with the frame units 22 removed so that the details of the wheel connection can be better viewed), a cross-connector 56 connects the opposed wheel assemblies through bars 50.

Figure 9:
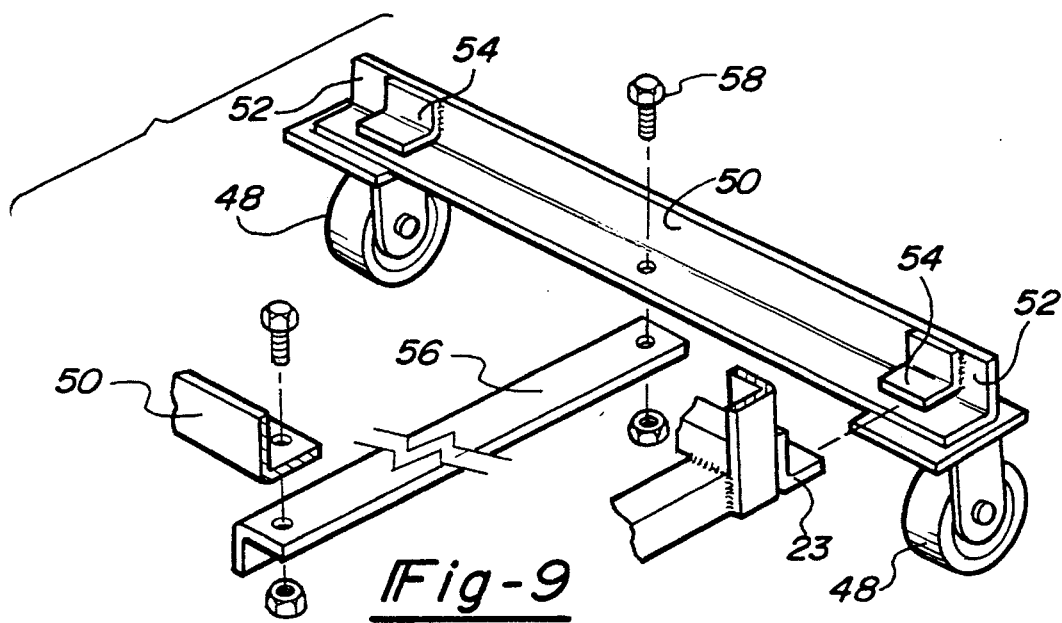
FIG. 9 is an assembly view of a portion of the device shown in FIG. 8.

As shown in FIG. 9, the cross connector 56 is bolted 58 to each of the bars 50. The flange mount 23 fits between flange top 54 and the bars 50. As can be understood, the bars 50 could be simply moved onto each end of the frame units 22 to receive the flange mounts 23, and then the opposed bars 50 can be connected by the cross bar 56. In this way, the overall system allows further easy modification of the system to accommodate particular applications.

As shown in FIG. 10, when it is desired to have a smaller wheel mounted frame assembly than that shown in FIG. 7, the second frame unit 22 may be omitted. Instead, a handle 66 having downwardly extending handle bars 66 may be connected to one of the bars 50. As shown, one bar 50 is connected to each of the pair of handle bars 66. A cross bar 56 is still included with this application.

As shown in FIG. 11, the flange top 54 now fits into the interior of the base bar 28 from the storage frame unit 22. The handle bar 66 receives a bolt 68 that passes through the base bar 28, thus securing the bar 50 to the base bars 28, and also to the handle bars 66. An alternative cross bar 56a, which is essentially a flat bar, is used in this embodiment with a pin at each end. This facilitates the easy connection of the assembly.

As shown in FIG. 12, the flange top 54 is received within the interior of the channel of base bar 28. As shown in FIG. 13, bolt 68 secures the members together.

As should be appreciated, the inventive storage frame system allows easy modification to accommodate any one of several storage applications. The few members can be easily modified into systems that can store a large number of panels, and may also allow easy transport of those panels by mounting them on the inventive wheel assemblies. The structure of the wheel assemblies and the frame members provides easy modification, and yet good structural integrity to the combined members.

While a preferred embodiment of this invention has been disclosed, it should be understood that various modifications of this system would come within the scope of this invention. For that reason, the following claims should be studied in order to determine the true scope and content of this invention.

I claim:

1. A system for storing panel members comprising:

a frame unit including a pair of rear support bars extending generally vertically;

a pair of forward support bars attached to said rear support bars adjacent an upper end of rear support bars, said forward support bars extending from said connection adjacent a top of said rear support bars at a small acute angle, said pair of rear support bars and said forward support bars being spaced by a lateral distance;

a lateral frame member being fixed to connect said spaced attached rear support bars and forward support bars;

forwardly extending base bars extending from each of said rear support bars, and being connected to said rear support bar and said forward support bar at each lateral side;

said acute angle being less than ten degrees;

said base bars extending to a forwardmost position of said frame unit, and said base bars being unconnected forwardly of said lateral frame member, such that a worker can move easily between said base bars; and said base bars having hollow channels such that extension members may be connected to said base bars by utilizing connections that plug into said hollow channels.

2. A system for storing panel members comprising:

a frame unit including a pair of rear support bars extending generally vertically;

a pair of forward support bars attached to said rear support bars adjacent an upper end of rear support bars, said forward support bars extending from said connection adjacent a top of said rear support bars at a small acute angle, said pair of rear support bars and said forward support bars being spaced by a lateral distance;

a lateral frame member being fixed to connect said spaced attached rear support bars and forward support bars;

forwardly extending base bars extending from each of said rear support bars, and being connected to said rear support bar and said forward support bar at each lateral side; and said base bars are formed of hollow channels, and an opposed frame unit comprising said rear support bars, said forward support bars, and said base bars, is connected in a facing orientation with a first said frame unit, by connectors inserted into the hollow channels on said base bars from both said first and second frame units.

3. A system as recited in claim 2, wherein said acute angle is less than 10 degrees.

4. A system as recited in claim 2, wherein said base bars extend to a forwardmost position of said frame unit, and forwardmost ends of said base bars being unconnected such that a worker can move easily between said base bars.

5. A system as recited in claim 2, wherein said base bars have hollow channels, and extension members may be connected to said base bars by utilizing connections that plug into said hollow channel.

6. A frame system as recited in claim 2, wherein said frame units are connected together, and also connected to wheel assemblies at each axial end of the overall system.

7. A system as recited in claim 1, wherein said system is adapted to be attached to a wheel assembly such that it may easily transported.

8. A system as recited in claim 7, wherein a flange extends rearwardly from each lateral side of said frame unit, said wheel assembly extending between two lateral sides and including a space for receipt of said flange, at each lateral end of said wheel assembly, such that said wheel assembly easily mounts said storage unit.

9. A system as recited in claim 8, wherein said space is formed by a top flange and a bottom support member, said flange extending rearwardly from said rear support bar of said frame unit and into said space at each lateral side of said wheel assembly.

10. A system as recited in claim 9, wherein said frame unit extending between two axial ends, wheel assemblies are mounted at each said axial end of said frame unit, and said wheel assemblies are connected by a cross-bar.

11. A system as recited in claim 10, wherein a frame unit as described is connected at one of said axial ends to one of said wheel assemblies, and a handle unit is connected at the opposed of said axial ends.

12. A wheel assembly for selectively mounting a frame comprising:

a pair of wheels connected by a laterally extending bar, a space defined between a base of said laterally extending bar, and a flange top defined adjacent to said base; and a frame unit extending between two lateral sides, and mounted on said wheel assembly, said frame unit including a structural frame for mounting panel members, and said frame unit including a flange mount extending rearwardly from each said lateral side of said frame unit, each of said flange mounts being received within said space.

13. An assembly as recited in claim 12, wherein a second frame unit is connected at a second end of said wheel assembly, said first and second frame units each comprising a forward support bar extending at a small acute angle relative to a rear support bar, and said forward support bars on each of said first and second frame units extending towards each other, such that said frame units face each other on the combined frame system.

14. An assembly as recited in claim 13, wherein said forward support bar extends at an acute angle relative to said rear support bar.

15. An assembly as recited in claim 14, wherein said acute angle is less than 10 degrees.

16. An assembly as recited in claim 12, wherein a second wheel assembly is connected to a handle member.

17. An assembly as recited in claim 16, wherein said frame unit includes a pair of hollow bars extending forwardly, said hollow support bars being received upon said flange top of said opposed wheel assembly, and handle bar members being bolted to said hollow support bar, securing said wheel assemblies, said base bars, and said handle together.

18. A framing system for storing panels comprising the following selectively utilizable components:

a basic frame unit comprising a pair of laterally spaced rear support bars extending generally vertically upwardly;

a pair of forward support bars connected at upper ends of said rear support bars, and extending at a small acute angle from said upper ends of said rearward support bars;

base bars fixed to each of said rear support bars and said forward support bars and extending forwardly beyond said forward support bars to provide a base support for panels;

a laterally extending frame connecting said rear support bars;

base bar extension members selectively inserted into said hollow base bar members, and including a plug in connector;

universal connector members for connecting opposed base bars to connect two basic frame units together; and wheel assemblies comprising a pair of wheels connected by a lateral frame, and a flange top spaced above said lateral frame, said flange top and said lateral frame defining a space to receive a mount member from said basic frame unit at each lateral side.

19. A system as recited in claim 18, further comprising:

a handle member for selective connection to one of said wheel assemblies.

20. A system as recited in claim 18, wherein said mount member on said basic frame unit is a flange extending rearwardly from said rear support bar, and at a vertically lowermost portion of said rear support bar such that when said basic frame unit is utilized without wheel assemblies, said flange mount rests on the ground.

* * * * *